US006065494A

United States Patent [19]

Thomsen et al.

[11] Patent Number: 6,065,494

[45] Date of Patent: May 23, 2000

[54] HYDRAULIC FUNCTION-PERFORMING UNIT

[75] Inventors: Svend Erik Thomsen, Racine, Wis.; Finn Visgaard Nielsen; Poul Ennemark, both of Sønderborg, Denmark

[73] Assignee: Danfoss A/S, Nordborg, Denmark

[21] Appl. No.: 08/702,688

[22] PCT Filed: Feb. 9, 1995

[86] PCT No.: PCT/DK95/00061

§ 371 Date: Nov. 6, 1996

§ 102(e) Date: Nov. 6, 1996

[87] PCT Pub. No.: WO95/22004

PCT Pub. Date: Aug. 17, 1995

[30] Foreign Application Priority Data

Feb. 10, 1994 [DE] Germany ............................ 44 04 224

[51] Int. Cl.[7] ............................ F16K 71/00; F16K 11/00

[52] U.S. Cl. ....................... 137/552; 137/269; 137/487.5; 137/554; 137/557; 137/884

[58] Field of Search .................................... 137/554, 557, 137/487.5, 269, 270, 884, 552

[56] References Cited

U.S. PATENT DOCUMENTS

| | | | |
|---|---|---|---|
| 3,776,249 | 12/1973 | Walles et al. | 137/487.5 |
| 4,324,366 | 4/1982 | Geier et al. | 137/487.5 |
| 4,469,128 | 9/1984 | Patrimaux et al. | 137/554 |
| 4,911,192 | 3/1990 | Hartfiel et al. | 137/487.5 |
| 5,184,647 | 2/1993 | Goedecke et al. | 137/884 |
| 5,190,068 | 3/1993 | Philbin | 137/487.5 |
| 5,301,717 | 4/1994 | Goedecke | 137/884 |
| 5,325,884 | 7/1994 | Mirel et al. | 137/487.5 |

FOREIGN PATENT DOCUMENTS

| | | | |
|---|---|---|---|
| 3836594 | 5/1990 | Germany | 137/884 |

*Primary Examiner*—A. Michael Chambers
*Attorney, Agent, or Firm*—Lee, Mann, Smith, McWilliams, Sweeney & Ohlson

[57] ABSTRACT

A hydraulic function-performing unit is described, having a main housing and at least one movable function-performing element, the position and/or movement of which in the main housing determines flow and/or pressure conditions and/or chamber volumes for hydraulic fluid, and having at last one sensor. It is desirable for the construction of such a function-performing unit to be simplified. To that end, the sensor is accommodated inside a sensor housing. The sensor housing and the main housing have adjoining interface faces and there is provided a transmission channel which is led through the interface face and connects a measuring point in the main housing to the sensor.

17 Claims, 3 Drawing Sheets

HYDRAULIC FUNCTION-PERFORMING UNIT

BACKGROUND OF THE INVENTION

The invention related to a hydraulic function-performing unit having a main housing and at least one movable function-performing element, the position and/or movement of which in the main housing determines flow and/or pressure conditions and/or chamber volumes for hydraulic fluid, and having at least one sensor.

Hydraulic function-performing units which come into consideration include, for example, valves, especially proportional valves, in which the function-performing element is formed by the valve member, a main slide valve or a compensating slide valve. Here, the control of the movement or the position of at least one function-performing element is often effected externally, and in some cases only indirectly. The function-performing unit may, however, also be in the form of an actuating unit, for example a piston-cylinder unit. The function-performing element, the piston, is here displaced by the hydraulic fluid.

U.S. Pat. No. 4,796,661 discloses the incorporation of a pressure sensor in a proportional electro-hydraulic pressure control valve, the sensor delivering an electrical output signal which can be used to indicate the controlled pressure numerically or to effect control of the current of a magnet which in its turn is responsible for the position of the valve member in the valve housing.

Furthermore, it is known from an electronic load sensing system "E.LS.A" of the firm Barmag AG, Remscheid, to provide a valve block comprising electrically controlled proportional displacement valves with pressure sensors which detect the pressure difference between pump delivery flow and maximum active load.

It is also known from German patent application P 42 41 848, which is not a prior publication, to use a pressure sensor in a controlled proportional valve, the pressure sensor converting the maximum load pressure into an electrical voltage signal.

The installation of sensors in the function-performing unit is not always without problems. Normally, not only do additional bores have to be made, through which the hydraulic fluid is able to reach the sensors or the vicinity of the sensors, seats for the sensors also have to be provided. Not only do these seats have be constructed so that the sensor has sufficient room, the sensor must normally also be safeguarded against being forced out of the housing again under the influence of the hydraulic pressure. On the other hand, the sensors are in many cases sensitive to damage. Such damage can easily occur as the function-performing unit is being assembled, that is, as the sensor is being installed in the function-performing unit.

SUMMARY OF THE INVENTION

The invention is therefore based on the problem of simplifying the mechanical construction of a function-performing unit having a sensor.

This problem is solved in the case of a function-performing unit of the kind mentioned in the introduction in that the sensor is accommodated inside a sensor housing, the sensor housing and the main housing have adjoining interface faces, and there is provided at least one transmission channel which is led through the interface face and connects a measuring point in the main housing to the sensor.

The function-performing unit is divided by this construction into several sections. One section, which is formed essentially by the main housing and the parts it contains, serves merely for realization of the function of the function-performing unit. This section need not differ substantially from a conventional function-performing unit without sensors. The other section, which is essentially formed by the sensor housing and the parts it contains, serves to determine the required measurement values in the function-performing unit. Both parts can be manufactured separately from one another. Because the sensors are housed in the sensor housing, they are also protected therein. The sensor housing can be transported and handled as a unit without problems, without risk of the sensors contained therein being damaged during transport or during manufacture, that is, as the function-performing unit is being assembled. Because the sensor housing lies adjacent to the main housing by way of an interface face, the physical variable that is to be measured is able to reach the sensor by way of this interface face, in particular through the said transmission channel, without the sensor having to project into the main housing. This possibility is not excluded, in particular when a displacement measuring device is being used as sensor. In that case, mechanical transmission means, such as a plunger or similar means, for example, can be incorporated in the transmission channel. The interface face can be sealed relatively easily, so that no leakage problems arise as a result of the external mounting of the sensor or sensors. The mechanical construction of the function-performing unit is consequently quite considerably simplified. The transmission channel can be manufactured relatively easily.

This is the case in particular when the transmission channel runs substantially at right angles to the interface face. In that case, it can be constituted, for example, by a bore. It may, however, already have been incorporated in the main housing during manufacture thereof, for example, by casting.

The sensor is preferably inserted from the interface face into the sensor housing. The transmission channel is for that purpose, for example, in the form of a blind bore. Pressures of the hydraulic fluid that act on the sensor press it only deeper into the sensor housing, without risk of the sensor being forced out of the housing.

Several transmission channels are preferably provided, of which at least one receives, in place of or in addition to the sensor, an actuating element for acting on the position of the function-performing element. Parallel with the sensor or sensors there may, of course, also be provided the corresponding actuating elements, for example, magnets, for setting the position of the function-performing element, for example, a slide valve. This is particularly advisable when on or in the sensor housing there is arranged a control means that produces the appropriate actuating signals for movement of the function-performing element after evaluating the output signals of the sensor or sensors. When sensors are referred to hereinafter, an actuating element can also be intended in place of the sensor, if this is appropriate, without this being mentioned.

Several transmission channels are preferably provided, of which at least one has a blind termination in the sensor housing. Sensor housings of a single type having a plurality of transmission channels can be provided in that case. Depending on requirements, not all transmission channels in fact need to be equipped with sensors. In many cases it will be sufficient to provide just one or a few transmission channels with sensors. The remaining transmission channels remain empty, which does not, however, disturb the function of the function-performing unit, in particular not when the part of the transmission channel that has a blind termination in the sensor housing is not continued into the main housing.

Even when a transmission channel without sensors is continued into the main housing, no mechanical change, for example, a different flow geometry, has to be made in the main housing when, in a preferred embodiment, at least one transmission channel is provided with a blind stopper extending into the main housing, in particular up to the measuring point. This construction means that only a few main housings are required. The main housings can be configured so that basically sensors can be inserted at all the relevant points. If it proves to be the case that sensors are not necessary at all points, the transmission channels, or more accurately, the corresponding sections of the transmission channels in the main housing, can again be closed using blind stoppers. Great flexibility in manufacture is consequently achieved, with minimal stock-holding and minimal structural complexity, because one main housing can be used for a plurality of possibilities.

It is also preferred for the transmission channel to run substantially at right angles to the direction of the flow path. In this construction there is no risk that the sensor or the sensor housing will collide with the flow path and the lines connected thereto, which externally lead away from the main housing.

It is also preferable for the interface face to be arranged substantially at right angles to a flange face on the main housing. Several function-performing units, in particular several proportional valves, if desired with further valves, are in many cases arranged side by side over such flange faces. This possibility is not adversely affected by the sensor housing, since the interface face is arranged at right angles to the flange face, that is, the sensor housing projects transversely to adjacent valves.

At least one base section and one input section are preferably provided, each section having at least one sensor. The base section and the input section can thus be monitored separately from one another.

It is also preferable for a control unit to be connected to at least one sensor and to act on the position at least of the function-performing element. The control unit is also contained in the sensor housing. The control unit can, inter alia, change the position of the function-performing element on the basis of the physical variable determined by the sensor. Detection of the physical variable, for example, the pressure, temperature, through-flow or the like, can be realised relatively easily using a sensor. In most cases such a construction will be easier than the hydraulic return of the corresponding variable to an actuating member for displacement of the function-performing element. In this manner, using the same mechanical construction an improvement in control behaviour can be achieved, or, with the same control behaviour the mechanical construction can be quite significantly simplified.

The control unit is preferably connected to at least two sensors, which detect different physical variables. The possible ways of controlling the function-performing element are thus considerably widened, because further possibly occurring influences can now be taken into account.

In particular, at least one sensor is in the form of a pressure sensor, flow meter, temperature gauge, position sensor, contamination sensor or air sensor, and, where there are several sensors, a combination of some or all of these sensors, if desired with several sensors of the same kind, is provided. Pressures in the function-performing units can be detected using the pressure sensor or pressure sensors. When several pressure sensors are being used, pressure differences can also be detected over specific sections of the flow path between the input and the output of the function-performing unit. The flow meter provides information about the amount of hydraulic fluid flowing through; here, if desired, the rate of flow can also be evaluated. The temperature gauge detects the temperature of the hydraulic fluid. In several cases the temperature of the hydraulic fluid influences the control behaviour of the function-performing unit. This can be taken into account. In addition, using the temperature detection the cooling capacity can be matched to the temperature of the hydraulic fluid, which can lead to considerable saving of energy. The position sensor can detect the position of the function-performing element, for example, a slide valve. It therefore allows the position of this slide valve to be controlled, which can be of particular importance if the slide valve is being moved by remote control. The contamination sensor provides information about contamination of the hydraulic fluid. The control unit can emit warnings when the contamination level of the hydraulic fluid exceeds a certain degree and the fluid has to be exchanged or cleaned, as appropriate. Similarly, the air sensor provides information about the air contained in the hydraulic fluid, and thus about the compressibility of the hydraulic fluid. The latter influences the operation of the hydraulic system.

The sensor arrangement preferably comprises a pressure sensor for detecting the pressure upstream of the function-performing element, and a flow meter; the control unit contains a control circuit and a changeover device is provided which enters either the output signal of the pressure sensor or the output signal of the flow meter or both into the control circuit. When the control unit controls the function-performing element, for example, the main slide valve and the compensating slide valve of a proportional valve, in such a manner that there is a constant flow through the main slide valve, the valve is called a flow-through control valve. When the compensating slide valve is used to produce a constant pressure upstream of the main slide valve, the valve is called a pressure control valve. The decision as to which type of valve is used depends on the application. Occasionally, it can be an advantage, however, to be able to change the control behaviour of such a valve for a short time, in particular in experimental constructions. In that case, a simple changeover is sufficient to change from a flow-through control valve to a pressure control valve and vice versa. If both the pressure sensor and the flow meter are used, the control unit can also effect an output control.

Instead of or in addition to the flow meter, a position sensor for the function-performing element is preferably provided. If the function-performing unit is in the form of a valve and the function-performing element is in the form of a main slide valve, the position of the main slide valve enables information about the effective cross-section of the flow path to be obtained. If this and, in some cases, the pressure, are known, the quantity of fluid passing through can be determined. The use of a position sensor is in many cases simpler than installing a flow meter; with the latter, it is occasionally impossible to prevent the flow meter from influencing the flow behaviour of the hydraulic fluid flowing through.

The control unit preferably has an integrator for detecting the amount of hydraulic fluid that has flowed through. The output signal of the integrator enables information to be obtained about the movement or the assumed state of the function-performing element or of a drive member controlled by way of the function-performing unit, for instance, a piston-cylinder arrangement or a hydraulic rotary motor.

The sensor, of which there is at least one, is advantageously connected to a signal interface led to the outside.

The output signal of the sensor is therefore available not only locally for the local control unit, it can also be tapped externally so that information about the particular hydraulic function-performing unit is also available in a higher-level system. If an interface at which the output signals of the sensor are available in a predetermined form is used for that purpose, unified signal detection of several function-performing units can easily be carried out. In particular, it can be an advantage herein for the signal form to be identical for all sensors. Of course, the signal contents may vary from sensor to sensor. Each sensor can in that case be assigned an address. An alternative or additional possibility is to assign each sensor an identifying code, depending on its kind.

The control unit is advantageously connected to the signal interface. The sensors can be connected both directly and by way of the control unit to the signal interface. The connection by way of the control unit has the advantage that the control unit is able, if desired, to undertake signal processing. By connecting the control unit to the signal interface, not only can information about the actual state of the function-performing unit be relayed to an external location, but also information about the settings assumed by the control unit or its output signals.

The signal interface is preferably arranged to be connected to a bus line. By means of such a bus line the data transmission can take place in a relatively trouble-free manner even when several function-performing units are to be connected up.

A system control unit which receives signals from the sensors of hydraulically interconnected function-performing units and/or their control units and which produces output signals for control of a pressure source and/or other auxiliary devices is preferably provided. It is thus possible using relatively simple means to effect not only local control of the particular function-performing element, for example, load sensing, but also non-local or system-wide control, for example system load sensing, that is, the setting of the load pressure in a hydraulic system. For example, the pump pressure can be electronically controlled, such an electronic system being very much simpler to optimize to a desired control configuration. Electronic pressure measurement enables the pressure in the load to be monitored, both for the individual function-performing unit, for example, the individual proportional valve, by way of the local control unit, and also for the system as a whole with several function-performing units, for example, several proportional valves and connected units, by way of the system control unit. It is therefore possible to be involved in the control of individual valves and, for example, limit the pressure to predetermined limit values. Likewise, the mean pressure of the load can be calculated, which serves for detection of the static mean pressure of the load. If desired, a cavitation monitoring of attached hydraulic units, for example, of an attached hydraulic motor, can be carried out. By means of the system control unit it is possible in a simple manner to provide a higher-level priority control of the flow-through that is able to control different valve functions. This allows the capacity of the pump to be utilized to the full and prevents overloading of an attached drive motor. It is likewise possible to monitor the activity of the operator, so that given speed and/or acceleration curves are adhered to. An operator-programmed control characteristic, for example, progressive selection, can also be introduced. Because the sensors emit electronic output signals, which can be suitably further processed electronically, allowing a greater speed than the conventional processing of hydraulic signals, a plurality of further parameters can be taken into account. Improved control of the flow-through and of the pressure can be achieved by this means, or disturbance variables for changed load conditions can be compensated. For example, an algorithm which determines the instantaneous inertia and friction ratios that can then be entered in one or more control loops can be used. This is particularly advantageous if the temperature of the hydraulic fluid is also able to be incorporated into the control. Damping of oscillations in the system can also be achieved if the control of the main slide valve and/or of the compensating slide valve is effected in phase opposition in a control circuit.

The use of such function-performing units in the hydraulic system has the advantage that the system states, for example, pressures and flow rates, which would normally have to be measured using separate sensors, are instantly available, and precisely at those locations where they are influenced or where they occur. This not only significantly simplifies the construction of such a system, but also improves signal detection because the signals are generated directly where the hydraulic fluid is exerting an influence. The sensors are then as it were "hidden" in the individual function-performing units. Additional external components are therefore unnecessary. Because the sensors are incorporated in the individual function-performing units, the signals from the sensors in the individual units can enter directly into an internal control, and in an active manner. At the same time, the identical signals are present on the bus line for entry into a system control. For example, the states in one function-performing unit can be taken into account during the control or regulation of another function-performing unit. This enables mutual dependencies that could not be represented using conventional systems, or could only be represented with great difficulty, to be created.

BRIEF DESCRIPTION OF THE DRAWINGS

The invention is described hereinafter with reference to preferred embodiments in conjunction with the drawings, in which.

DESCRIPTION OF THE PREFERRED EMBODIMENTS

For the following explanation, a proportional valve is used by way of example as the hydraulic function-performing unit.

Figure 1:
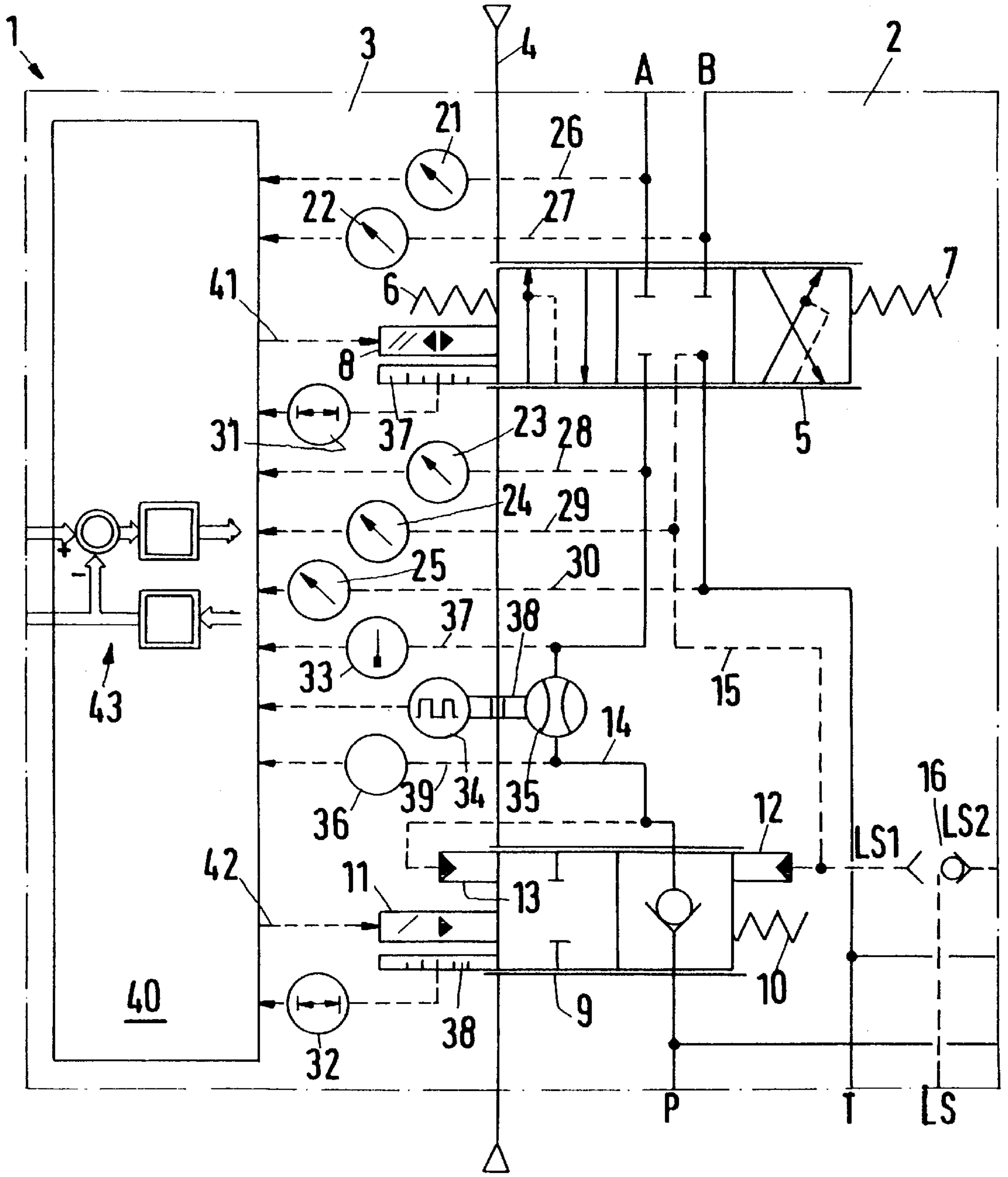
FIG. 1 is a diagrammatic representation of a function-performing unit in the form of a proportional valve.

The hydraulic proportional valve 1, which is illustrated merely diagrammatically in FIG. 1, comprises a valve housing 2 and a sensor housing 3, which lie adjacent to one another by way of an interface face 4. The valve housing 2 forms the "main housing".

A main slide valve 5 is displaceably mounted in the valve housing 2, and is loaded by two springs 6, 7 in opposing directions and is also displaceable by means of a driver 8. The main slide valve 5 is here the "function-performing element".

A compensating slide valve 9, which is loaded by a spring 10 in one direction and by a driver 11 in the opposing direction, is also provided in the valve housing 2. Moreover, the compensating slide valve has two pressure connections

12, 13, the pressures of which load the compensating slide valve likewise in the direction of movement. The compensating slide valve can be regarded as the second function-performing element.

A pump connection P which is connected to the compensating slide valve 9 is provided in the valve housing 2. The compensating slide valve 9 is connected by way of a channel 14 to the main slide valve 5. The main slide valve in its turn is connected to two working connections A and B. The input side of the main slide valve 5, that is, the side at which the channel 14 opens, is connected to a tank connection T. The main slide valve controls not only the amount of hydraulic fluid flowing through but also the direction, that is to say, the main slide valve determines which of the two working connections A and B is connected by way of the channel 14 to the pump connection P and which is connected to the tank connection T.

The channel 14 is furthermore connected to the pressure connection 13 which is arranged on the same side as the driver 11 of the compensating slide valve 9. At the main slide valve 5 there is also provided a load-sensing line which in the neutral setting of the main slide valve, which is shown in FIG. 1, is connected to the tank line, but on displacement of the main slide valve 5 in one or other direction is connected to the working connection connected to the pump connection P. The pressure present on the load-sensing line 15 is always the highest of the two pressures LS1 of the working connections A and B. The load-sensing line 15 is connected to a change-over valve 16, the output of which is connected to a load sensing connection LS. The other input of the changeover valve 16 is connected to a line LS2 via which the load sensing pressure of an adjacent proportional system can be supplied.

A plurality of sensors is housed in the sensor housing 3. Thus, there are pressure sensors 21 to 25, which are connected by way of transmission channels 26 to 30 to, in that order, the first working connection A, the second working connection B, the channel 14, the load-sensing line 15 and the tank connection T. Furthermore, a position sensor 31 for the position of the main slide valve 5 and a position sensor 32 for the position of the compensating slide valve 9 are provided. A temperature sensor 33 detects the temperature of the hydraulic fluid flowing in the channel 14. A flow meter 34, 35 detects the amount of fluid flowing through the channel 14. A further sensor 36 determines the contamination level and/or the air content of the hydraulic fluid. Transmission channels are also provided for the position sensors 31, 32, in which channels a respective measurement scale 37, 38 connected to the respective slide valve is able to move. The temperature sensor 33, the flow meter 34, 35 and the sensor 36 are connected by way of transmission channels 37 to 39 to the respective measuring points in the valve housing 2.

The sensor housing 3 also has a control unit 40, which actuates the main slide valve and the compensating slide valve 9 by way of corresponding channels 41, 42.

Figure 2:
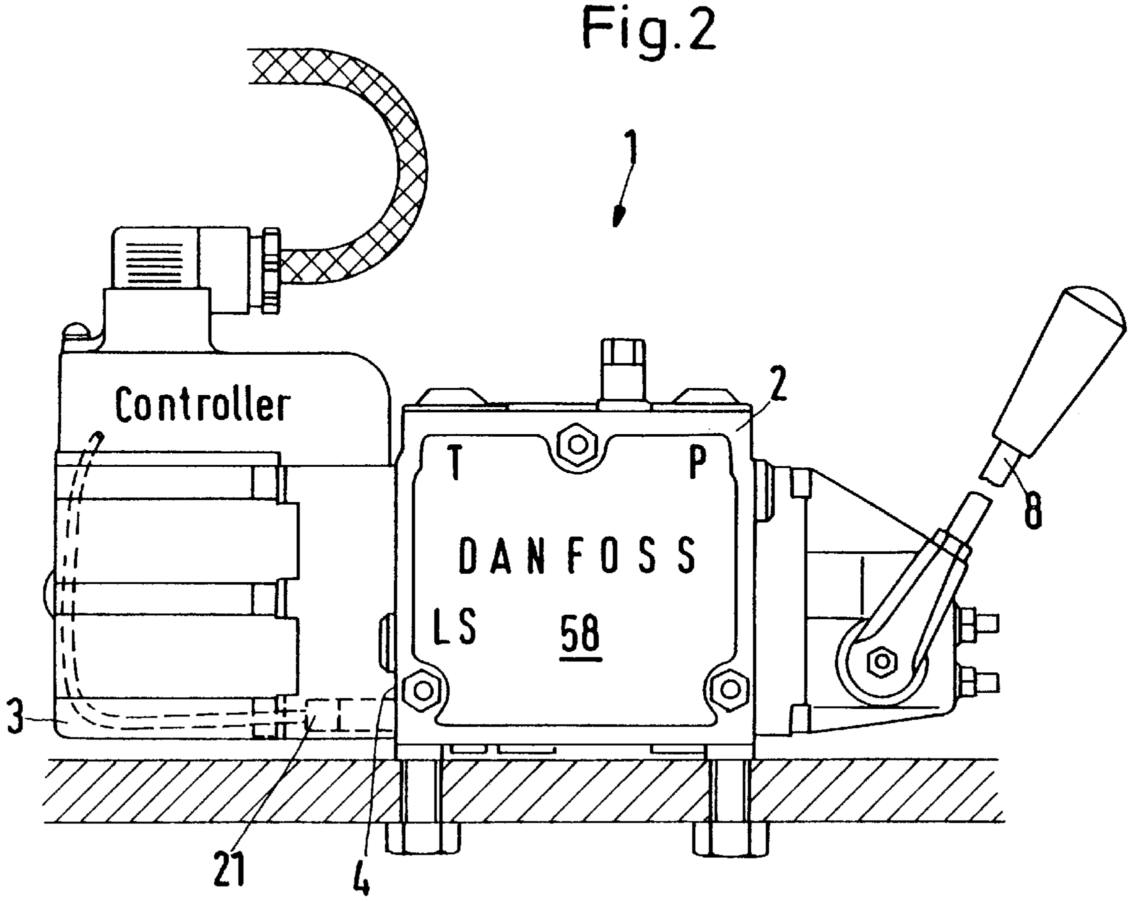
FIG. 2 shows the external construction of a function-performing unit in the form of a proportional valve.

The transmission channels 26 to 30 and 37 to 39 run substantially at right angles to the interface face 4. As apparent in particular from FIG. 2, the pressure sensors, of which the pressure sensor 21 is shown here, are inserted from the interface face 4 into the sensor housing 3, so that the pressure of the hydraulic fluid holds the corresponding sensor in the sensor housing 3. It is impossible, however, for the sensor to be forced out of the sensor housing by the pressure. Parallel to the plane of the drawing, a flange face 58 is shown, to which further valves can be attached to form a valve block, a construction which is generally well known.

An embodiment in which all transmission channels are provided with sensors is illustrated. This is not necessary, however, even when the corresponding transmission channels are provided both in the valve housing 2 and in the sensor housing 3. The corresponding transmission channels can either be left free, in which case they are blind, to prevent escape of hydraulic fluid, or they can be provided with stoppers which extend as far as the particular measuring points. The measuring points are in that case points at which the transmission channels branch off the respective lines or channels, for example, channel 14.

Figure 3:
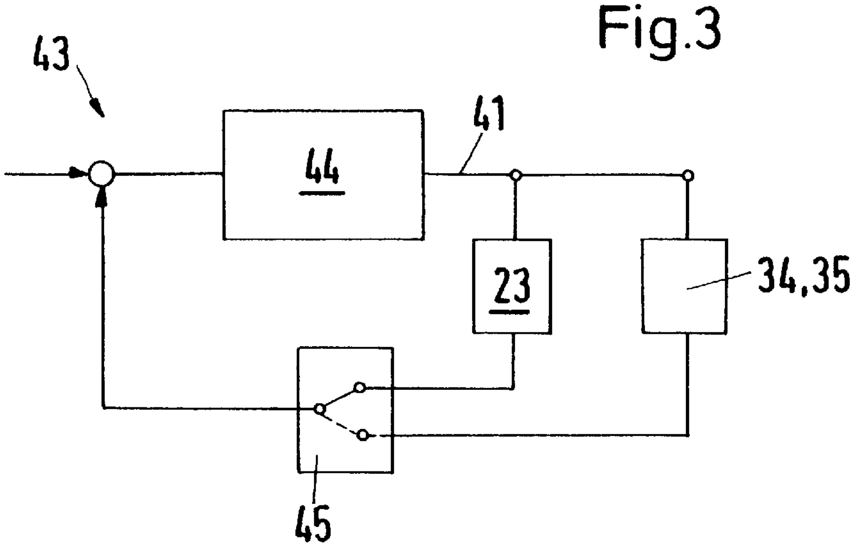
FIG. 3 is a diagrammatic representation of a control circuit.

A control circuit 43 is illustrated diagrammatically in the control unit 40. A special construction of such a control circuit 43 is explained in further detail in FIG. 3. The control circuit 43 comprises an actuator 44 for adjusting the main slide valve 5. The setting of the main slide valve 5 influences the pressure upstream of the main slide valve 5, which is detected by the pressure sensor 23, and the amount of hydraulic fluid flowing through the channel 14, which is detected by the flow meter 34, 35.

Either the pressure upstream of the main slide valve 5 or the amount of hydraulic fluid flowing through the channel 14 can be fed back into the control circuit by way of a change-over switch 45. In this manner it is possible using very simple means to use the valve either as a flow control valve or as a pressure control valve, depending on which signal is fed into the control circuit 43. In a manner not illustrated, the change-over device 45 can also be constructed so that it feeds both signals simultaneously back into the control circuit 43 in order to be able to effect an output control.

Figure 4:
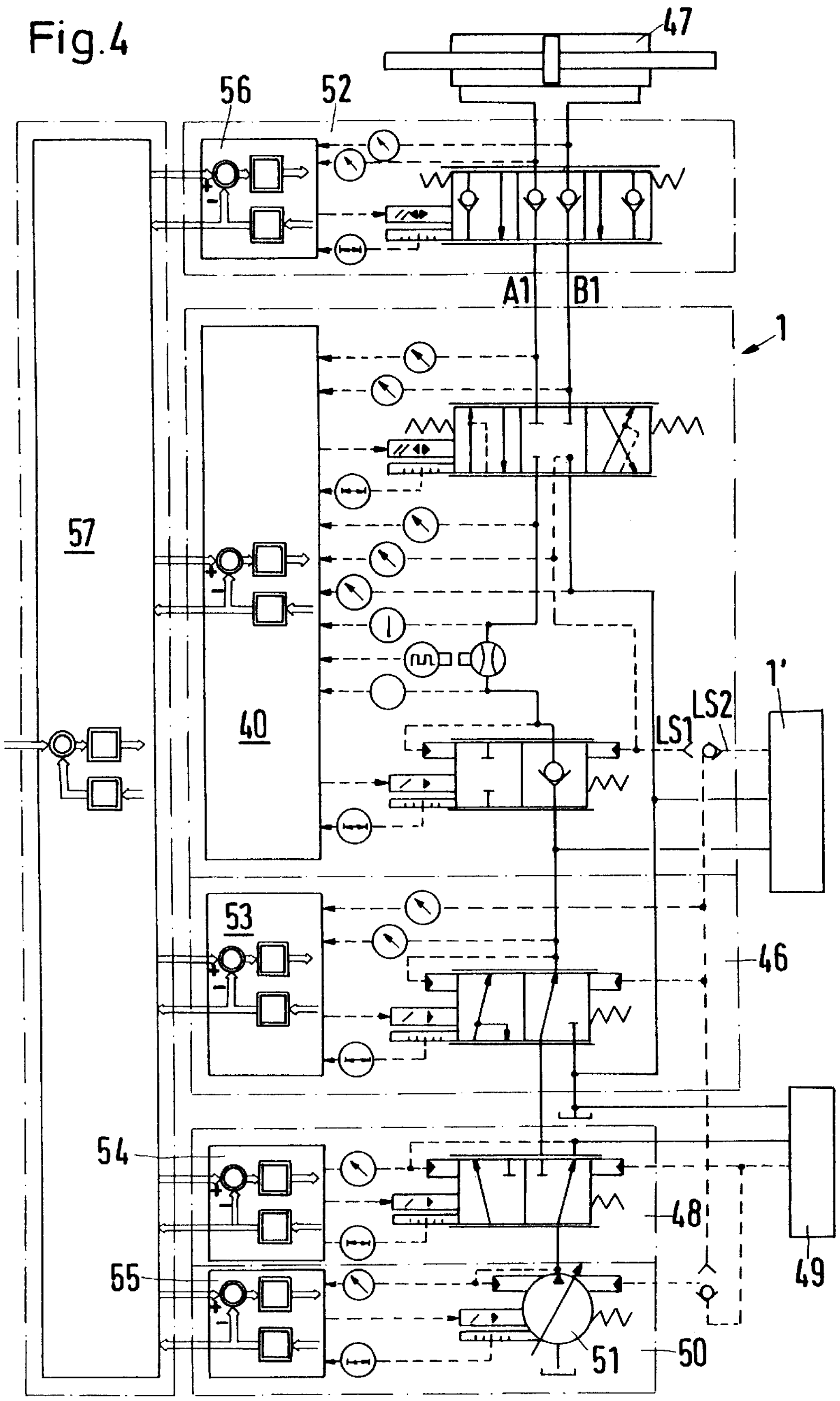
FIG. 4 is a fragmentary view of a hydraulic system.

FIG. 4 shows the connection of the proportional valve 1 illustrated in FIG. 1 into a hydraulic system. The hydraulic system has at least one further proportional valve 1' with an attached load. The proportional valves 1 and 1' have a common input section 46, which ensures adaptation to the highest load pressure. A hydraulic motor 47 is illustrated here as the load for the proportional valve 1. A divider section 48, which supplies the load 49 with hydraulic fluid, preferably at a higher priority, is connected upstream of the input section 46. The hydraulic fluid is in this case delivered by a pump section 50 which comprises a pump 51 with adjustable output. Between the proportional valve 1 and the motor 47 there is also a load-maintaining section 52.

Each section 1, 46, 48, 50, 52 has its own local control unit 40, 53, 54, 55, 56, which local control units are connected to a system control unit 57. The system control unit 57 can, of course, also receive input signals directly from the individual sensors, which are likewise provided in each section. The system control unit can in this manner carry out control of the entire system in the form of a higher-level control circuit, so that not only is excellent utilisation of the capacity of the pump 51 ensured, but also limit values are not exceeded and if necessary specific operational sequences are adhered to.

As especially clear from FIG. 4, not only are proportional valves used as hydraulic function-performing elements, but also distribution valves, priority valves or other hydraulic control means. In an extreme case, the hydraulic work motors could even be provided with a sensor housing. In that case, the size of the individual work chambers, for example, which is a measure of the hydraulic fluid required or used, could enter into a system control. Common to all function-performing units, however, is the fact that they have a part which comprises the mechanical or hydraulic construction and another part which comprises the sensors. These two parts are connected by way of the interface face. On the other side, the sensor part can also have a signal interface leading to the outside, so that the local control units are able to communicate either with a global control unit or with other local control units. For a central control unit, it is in many cases much easier to receive the signals from local control units than to have to evaluate these directly from the sensors.

The above-described construction enables a sensor module to be mounted on virtually any selected hydraulic module, which must of course be correspondingly constructed, so that the signals are able to pass from the sensors in the modules or units into an internal active control. At the same time, the same signals are available on the bus line for use in possibly provided other modules or units and/or in a higher-level system control.

What is claimed is:

1. A hydraulic function-performing unit having a main housing and at least one moveable function-performing element, at least one of the position and movement of which in the main housing determines at least one of flow and pressure conditions and chamber volumes for hydraulic fluid, and having at least one sensor, the sensor being accommodated inside a sensor housing, the sensor housing and the main housing having adjoining interface faces and including at least one transmission channel through the interface face and connecting a measuring point in the main housing to the sensor, and further including a control unit connected to at least two sensors which are connected to detect different physical variables, the control unit acting on the position of at least the function-performing element.

2. A hydraulic function-performing unit according to claim 1, in which the transmission channel runs substantially at right angles to the interface face.

3. A hydraulic function-performing unit according to claim 1, in which the sensor is inserted from the interface face into the sensor housing.

4. A hydraulic function-performing unit according to claim 1, including several of said transmission channels, at least one of said transmission channels receiving, in place of or in addition to the sensor, an actuating element having means for acting on the position of a function-performing element.

5. A hydraulic function-performing unit according to claim 1, including several transmission channels, of which at least one has a blind termination in the sensor housing.

6. A hydraulic function-performing unit according to claim 1, including several transmission channels, at least one having a blind stopper extending into the main housing up to the measuring point.

7. A hydraulic function-performing unit according to claim 1, in which the transmission channel extends substantially at right angles to the direction of a flow path of the hydraulic fluid through the function-performing unit.

8. A hydraulic function-performing unit according to claim 1, in which the interface is arranged substantially at right angles to a flange face on the main housing.

9. A hydraulic function-performing unit according to claim 1, having at least one base section and one input section, each section having at least one sensor.

10. A hydraulic function-performing unit according to claim 1, in which at least one sensor comprises one of a pressure sensor, flow meter, temperature gauge, position sensor, contamination sensor and air sensor, and, where there are several sensors, a combination of at least some of the sensors is provided.

11. A hydraulic function-performing unit according to claim 1, in which the sensors comprise a pressure sensor for detecting pressure upstream of a function-performing element and a flow meter, the control unit contains a control circuit and including a changeover device which feeds at least one of the output signal of the pressure sensor and the output signal of the flow meter into the control circuit.

12. A hydraulic function-performing unit according to claim 11, including a position sensor for the function-performing element.

13. A hydraulic function-performing unit according to claim 1, in which the control unit has an integrator for detecting the amount of through flow of hydraulic fluid.

14. A hydraulic function-performing unit according to claim 1, in which the sensor is connected to a signal interface connected to outside.

15. A hydraulic function-performing unit according to claim 14, in which the control unit is connected to the signal interface.

16. A hydraulic function-performing unit according to claim 14, in which the signal interface is connected to a bus line.

17. A hydraulic function-performing unit according to claim 1, including a system control unit receiving signals from the sensors of at least one of hydraulically interconnected function-performing units and control units for the function-performing units, and said system control unit having means to produce output signals for control of at least one of a pressure source and other auxiliary devices.

* * * * *